US010723822B2

(12) United States Patent
Kownacki et al.

(10) Patent No.: US 10,723,822 B2
(45) Date of Patent: Jul. 28, 2020

(54) [BIS(TRIHYDROCARBYLSILYL) AMINOSILYL]-FUNCTIONALIZED STYRENE AND A METHOD FOR ITS PREPARATION

(71) Applicants: Synthos Dwory 7 spolka z ograniczona odpowiedzialnoscia spolka jawna, Oswiecim (PL); FUNDACJA UNIWERSYTETU IM. ADAMA MICKIEWICZA W POZNANIU, Poznan (PL)

(72) Inventors: Ireneusz Kownacki, Powidz (PL); Bartlomiej Janowski, Debica (PL); Jaroslaw Rogoza, Kryspinow (PL); Hieronim Maciejewski, Poznan (PL); Anna Szymanska, Poznan (PL)

(73) Assignees: SYNTHOS DWORY 7 SPOLKA Z OGRANICZONA ODPOWIEDZIALNOSCIA SPOLKA JAWNA, Oswiecim (PL); FUNDACJA UNIWERSYTETU IM. ADAMA MICKIEWICZA W POZNANIU, Poznan (PL)

(*) Notice: Subject to any disclaimer, the term of this patent is extended or adjusted under 35 U.S.C. 154(b) by 0 days.

(21) Appl. No.: 16/076,019

(22) PCT Filed: Oct. 4, 2017

(86) PCT No.: PCT/EP2017/075251
§ 371 (c)(1),
(2) Date: Aug. 7, 2018

(87) PCT Pub. No.: WO2018/065486
PCT Pub. Date: Apr. 12, 2018

(65) Prior Publication Data
US 2019/0256624 A1    Aug. 22, 2019

(30) Foreign Application Priority Data
Oct. 6, 2016  (EP) .................................. 16461559

(51) Int. Cl.
| C08F 12/26 | (2006.01) |
| C07F 7/10 | (2006.01) |
| C08F 212/14 | (2006.01) |
| C08F 236/10 | (2006.01) |
| C08L 9/06 | (2006.01) |
| C07B 49/00 | (2006.01) |

(52) U.S. Cl.
CPC ............... *C08F 12/26* (2013.01); *C07F 7/10* (2013.01); *C08F 212/14* (2013.01); *C08F 236/10* (2013.01); *C08L 9/06* (2013.01); *C07B 49/00* (2013.01); *C08F 2800/20* (2013.01); *C08L 2205/025* (2013.01)

(58) Field of Classification Search
None
See application file for complete search history.

(56) References Cited

U.S. PATENT DOCUMENTS

| 3,109,871 | A | 11/1963 | Zelinski et al. |
| 3,253,008 | A | 5/1966 | Fink |
| 4,196,154 | A | 4/1980 | Tung et al. |
| 4,835,216 | A | 5/1989 | Morikawa et al. |
| 4,861,742 | A | 8/1989 | Bronstert et al. |
| 4,894,409 | A | 1/1990 | Shimada et al. |
| 4,935,471 | A | 6/1990 | Halasa et al. |
| 5,550,203 | A | 8/1996 | Engel et al. |
| 6,515,087 | B2 | 2/2003 | Hsu et al. |
| 6,627,721 | B1 | 9/2003 | Rodewald et al. |
| 6,627,722 | B2 | 9/2003 | Rodewald et al. |
| 6,630,552 | B1 | 10/2003 | Rodewald et al. |
| 6,670,471 | B1 | 12/2003 | Rodewald et al. |
| 8,431,644 | B2 | 4/2013 | Uesaka |
| 9,315,600 | B2 | 4/2016 | Hayata et al. |
| 9,587,060 | B2 | 3/2017 | Halasa et al. |
| 10,259,830 | B2 | 4/2019 | Maciejewski et al. |
| 2003/0134997 | A1 | 7/2003 | Rodewald et al. |
| 2004/0044157 | A1 | 3/2004 | Halasa et al. |
| 2004/0044202 | A1 | 3/2004 | Halasa et al. |
| 2004/0063884 | A1 | 4/2004 | Halasa et al. |
| 2004/0122194 | A1 | 6/2004 | Halasa et al. |
| 2004/0122224 | A1 | 6/2004 | Halasa et al. |
| 2005/0131181 | A1 | 6/2005 | Halasa et al. |
| 2007/0123631 | A1 | 5/2007 | Halasa et al. |
| 2009/0023861 | A1 | 1/2009 | Shimakage et al. |

(Continued)

FOREIGN PATENT DOCUMENTS

| EP | 0 316 255 | 5/1989 |
| EP | 0 590 491 | 4/1994 |
| EP | 1 792 892 | 6/2007 |
| EP | 2 182 028 | 5/2010 |
| EP | 2 196 326 | 6/2010 |
| EP | 2 277 940 | 1/2011 |
| EP | 2 749 575 | 7/2014 |
| EP | 2 772 515 | 9/2014 |
| JP | 7-82422 | 3/1995 |
| JP | 9-227636 | 9/1997 |
| JP | 2000-086727 | 3/2000 |
| JP | 2004-59781 | 2/2004 |

(Continued)

OTHER PUBLICATIONS

Office Action issued in U.S. Appl. No. 15/565,346 dated May 22, 2019.

(Continued)

*Primary Examiner* — Robert S Loewe
(74) *Attorney, Agent, or Firm* — Nixon & Vanderhye P.C.

(57) ABSTRACT

The invention relates to [bis(trihydrocarbylsilyl)aminosilyl]-functionalized styrene and a method for its preparation. The invention further relates to the use of the styrene derivative in the preparation of a copolymer thereof. The styrene derivative is preferably used as comonomer in the production of elastomeric copolymers. Alternatively, or additionally, it is used in the preparation of a polymerization initiator.

11 Claims, No Drawings

(56) References Cited

U.S. PATENT DOCUMENTS

| | | | |
|---|---|---|---|
| 2010/0116404 | A1 | 5/2010 | Lechtenboehmer et al. |
| 2010/0152364 | A1 | 6/2010 | Wong et al. |
| 2010/0190885 | A1 | 7/2010 | Hua et al. |
| 2011/0275756 | A1 | 11/2011 | Ito et al. |
| 2012/0041134 | A1 | 2/2012 | Ito et al. |
| 2014/0275430 | A1 | 9/2014 | Ishino et al. |
| 2018/0065996 | A1 | 3/2018 | Maciejewski et al. |
| 2018/0072101 | A1 | 3/2018 | Janowski et al. |
| 2018/0072821 | A1 | 3/2018 | Janowski et al. |

FOREIGN PATENT DOCUMENTS

| | | |
|---|---|---|
| JP | 2005-232261 | 9/2005 |
| JP | 2010-116556 | 5/2010 |
| JP | 2011-79913 | 4/2011 |
| JP | 2012-197406 | 10/2012 |
| JP | 2013-155253 | 8/2013 |
| JP | 2013-249418 | 12/2013 |
| JP | 2014-001308 | 1/2014 |
| JP | 2014-105241 | 6/2014 |
| JP | 2018-513907 | 5/2018 |
| JP | 2019-521951 | 8/2019 |
| WO | WO 2011/076377 | 6/2011 |
| WO | WO 2013/077021 | 5/2013 |
| WO | WO 2016/008507 | 1/2016 |
| WO | WO 2016/162473 | 10/2016 |
| WO | WO 2016/162482 | 10/2016 |
| WO | WO 2016/162528 | 10/2016 |
| WO | WO 2018/065494 | 4/2018 |

OTHER PUBLICATIONS

Office Action issued in U.S. Appl. No. 15/565,360 dated Jun. 19, 2019.
Office Action issued in KR Appln. No. 10-2018-7023211 dated Sep. 23, 2019 (w/ translation).
Abstract of Rasul et al., "Hydrosilylation reactions of tetramethyldisilazanes and their derivatives" *Journal of Organometallic Chemistry*, vol. 655, iss. 1-2: 115-119 (Aug. 2002).
Abstract of Rietz et al., "Reaktionen von Bis(trimethylsilyl)amino-substituierten Chlorsilanen [(Me3Si)2N]Me2-nPhnSiCl (n=0, 1, 2) mit Lithium—Darstellung von Bis(trimethylsilyl)amino-substituierten Silyllithiumverbindungen und Disilanen" *Journal of Organometallic Chemistry*, vol. 556, Issues 1-2, Apr. 15, 1998, pp. 67-74.
Lee, S. et al., "Palladium-catalyzed synthesis of arylamines from aryl halides and lithium bis(trimethylsilyl) amide as an ammonia equivalent", Org. Lett., 2001 3(17), pp. 2729-2732.
Zapilko, C. et al., "Advanced Surface Functionalization of periodic mesoporous Silica: Kinetic Control by Trisilazane reagents", J. Am. Chem. Soc., 2006, 128(50), pp. 16266-16276.
International Preliminary Report on Patentability issued in PCT/EP2016/057735 dated Oct. 10, 2017.
International Preliminary Report on Patentability issued in PCT/EP2016/057757 dated Oct. 10, 2017.
International Preliminary Report on Patentability issued in PCT/EP2016/057834 dated Oct. 10, 2017.
International Search Report for PCT/EP2016/057735 dated Jun. 17, 2016, 4 pages.
International Search Report for PCT/EP2016/057757, dated Jun. 16, 2016, 2 pages.
International Search Report for PCT/EP2016/057834, dated Jun. 16, 2016, 4 pages.
International Search Report issued in PCT/EP2017/075251 dated Jan. 18, 2018.
International Search Report issued in PCT/EP2017/075262 dated Jan. 18, 2018.
Written Opinion of the International Searching Authority issued in PCT/EP2017/075251 dated Jan. 18, 2018.
Written Opinion of the International Searching Authority issued in PCT/EP2017/075262 dated Jan. 18, 2018.
Office Action issued in JP Appln. No. 2018-539809 dated Dec. 17, 2019 (w/ translation).
Office Action issued in JP Appln. No. 2017-552924 dated Dec. 24, 2019 (w/ translation).
Office Action issued in IN Appln. No. 201817028505 dated Dec. 26, 2019.
Office Action issued in IN Appln. No. 201717039943 dated Jan. 13, 2020.
Office Action issued in IN Appln. No. 201817028574 dated Feb. 20, 2020.
Office Action issued in KR Appln. No. 10-2017-7032696 dated Sep. 25, 2019 (w/ translation).
Office Action issued in JP Appln. No. 2017-552919 dated Nov. 19, 2019 (w/ translation).

[BIS(TRIHYDROCARBYLSILYL) AMINOSILYL]-FUNCTIONALIZED STYRENE AND A METHOD FOR ITS PREPARATION

This application is the U.S. national phase of International Application No. PCT/EP2017/075251 filed Oct. 4, 2017, which designated the U.S. and claims priority to EP Patent Application No. 16461559.3 filed Oct. 6, 2016, the entire contents of each of which are hereby incorporated by reference.

The invention relates to [bis(trihydrocarbylsilyl)aminosilyl]-functionalized styrene and a method for its preparation. The styrene derivative can be particularly applied in the production of styrene-butadiene rubbers having unique physicochemical properties. These rubbers are used in the preparation of compounded rubbers, for the manufacture of car tires.

An important parameter that determines whether styrene-butadiene rubber can be used in the manufacture of tires and other elastomeric commercial products is the rubber's compatibility with commonly used fillers, such as carbon black and silica. An increase in the interactions between styrene-butadiene rubber and inorganic filler can be achieved by introducing appropriate functional group-containing polymeric fragments that enhance the polymer's affinity to the applied filler.

U.S. Pat. No. 4,894,409 teaches a rubber composition comprising not less than 20% by weight of an amino group-containing diene based polymer in a rubber component, and 10 to 100 parts by weight of silica as a filler with respect to 100 parts by weight of the rubber component.

U.S. Pat. No. 4,935,471 B discloses that the introduction of nitrogen-containing functional groups into the polymer structure results in a strong enhancement of the affinity of functionalized polymers to carbon black. A clear increase in the compatibility of modified polybutadiene with the filler was observed even after the introduction of one terminal functional group containing a tertiary nitrogen atom (e.g. —CN or —NMe$_2$) into polymer chains. In addition to the increase in affinity of the modified polymer to the filler, a clear improvement in filler dispersion in the rubber compound was observed. In the examples of U.S. Pat. No. 4,935,471, methods for the synthesis of initiators of living anionic polymerization based on aromatic N-heterocyclic compounds such as pyrrole, imidazole, pyrazole, pyrazine, pyrimidine, pyridazine, and phenanthroline derivatives and their use in the production of N-functionalized polybutadienes are described. A similar approach is disclosed in U.S. Pat. No. 6,515,087 B, EP 0 590 491 A1 and WO2011/076377 A, where acyclic and cyclic amines are employed for the preparation of active initiators for anionic polymerization. In a further step, amines are used for the preparation of di-N-functionalized styrene-butadiene polymers.

Silicon and/or nitrogen atom-containing vinyl compounds are further taught in US 2004/0044202 A1, EP 2 749 575 A1, US 2012/0041134 A1, EP 2 277 940 A1, and US 2004/0063884 A1.

The synthesis of di-N-functionalized styrene-butadiene polymers is also disclosed in U.S. Pat. Nos. 4,196,154 B, 4,861,742 B and 3,109,871 B. However, to obtain the above polymers, amino-functional aryl methyl ketones are applied as reagents. The latter plays also the role of a functionalizing agent and polymerization terminating agent. The above N-modification methods only allow the preparation of polydienes containing no more than two amino-functional groups per polymer chain.

Another approach to prepare N-functionalized polymers with different N-functional group contents consists in the introduction of suitable styrene monomers into the polymer chain. The controlled introduction of the styrene monomers to the reaction system will result in a wide range of styrene-butadiene rubbers with different N-functional group contents, thereby with different dispersion properties for inorganic fillers. US2007/0123631 A1 discloses the preparation of N-functionalized styrene monomers via the reaction of a diverse range of acyclic and cyclic lithium amides (LiNR$^1$R$^2$, e.g. LiNEt$_2$, LiNMePh, LiN(SiMe$_3$)$_2$, LiNC$_4$H$_8$, and LiNC$_5$H$_{10}$) with 1,3- or 1,4-divinylbenzene, 1,3-di(isopropylene)benzene or a mixture of isomeric chloromethylstyrenes that in a further step are used in the preparation of styrene-butadiene rubbers with different contents of amino-functional groups.

EP 2 772 515 A1 teaches a conjugated diene polymer obtained by polymerizing a monomer component including a conjugated diene component and a silicon-containing vinyl compound. The silicon-containing vinyl compound may be a silyl-substituted styrene. However, the compounds according to EP 2 772 515 A1 are hydrolytically unstable under the typical processing conditions, compare the N,N-bis(SiMe$_3$)$_2$ aniline derivatives disclosed in Org. Lett. 2001, 3, 2729.

The prior art is only concerned with the preparation of N-functionalized polydienes with a different content of N-functionality which can interact with commonly-used fillers, i.e. silica and carbon black through non-covalent interactions. However, standard formulations very often comprise both types of filler, silica and carbon black, in different ratios.

Therefore, it was the object of the present invention to overcome the disadvantages associated with the prior art and to provide functionalized styrene derivatives whose application in the synthesis of polydienes leads to end-chain and/or in-chain modified SBR polymer compositions that have better affinity to both of the two typical fillers commonly applied in tire production, i.e. silica and carbon black. The functionalized styrene derivatives should also be hydrolytically more stable than those of EP 2 772 515 A1.

It has now surprisingly been found that this object is solved by the [bis(trihydrocarbylsilyl)aminosilyl]-functionalized styrene derivatives of Formula (I)

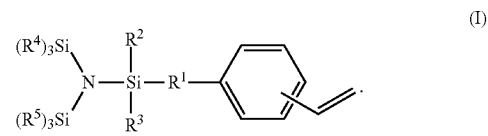

wherein R$^1$ is selected from the group consisting of:
a) a single bond;
b) —(CH$_2$)$_n$—, wherein n represents an integer from 1 to 12;
c) —(CH$_2$CH$_2$Y)$_n$—, wherein n represents an integer from 1 to 12, and Y can independently be oxygen or sulfur;
d) —CH$_2$—(CH$_2$CH$_2$Y)$_n$—CH$_2$—, wherein n represents an integer from 1 to 12, and Y can independently be oxygen or sulfur;
e) —(CH$_2$CH$_2$NR)$_n$—, wherein n represents an integer from 1 to 12, and R can independently represent an alkyl group containing from 1 to 10 carbon atoms, or an aryl or aralkyl group containing from 6 to 10 carbon atoms;

f) —CH$_2$—(CH$_2$CH$_2$NR)$_n$—CH$_2$—, wherein n represents an integer from 1 to 12, and R can independently represent an alkyl group containing from 1 to 10 carbon atoms, or an aryl or aralkyl group containing from 6 to 10 carbon atoms;

R$^2$, R$^3$ can be the same or different and represent an alkyl group containing from 1 to 10 carbon atoms, or an aryl or aralkyl group containing from 6 to 10 carbon atoms; and R$^4$ and R$^5$ can be the same or different, and each R$^4$ and R$^5$ independently represents an alkyl group containing from 1 to 10 carbon atoms, or an aryl or aralkyl group containing from 6 to 10 carbon atoms.

The compounds of Formula (I) are monomeric styrene derivatives. Employing these styrene derivatives (containing the moiety {(R$^5$)$_3$Si}{(R$^4$)$_3$Si}NSiR$^3$R$^2$—(R$^1$)— in their structure) in the synthesis of SBR polymers not only increases the affinity of the modified polymers to the commonly used fillers via non-covalent interactions, but also provides for covalent interactions between the modified polymer and filler, in particular silica, due to the reactivity of the {(R$^5$)$_3$Si}{(R$^4$)$_3$Si}NSiR$^3$R$^2$—(R$^1$)— moiety.

Surprisingly, it was found that the preparation of rubber compounds based on styrene-butadiene rubbers modified with a small amount of styrene derivative of Formula (I) leads to copolymers that give rubber compositions having by 32% better wet grip and by 27% better rolling resistance as compared to those prepared on the basis of non-functionalized styrene. Thus, the styrene derivatives according to the present invention are preferably used as comonomers in the production of elastomeric copolymers. Alternatively, or additionally, they are preferably used in the preparation of polymerization initiators.

Further, it was found that the bis(trimethylsilyl)amino- or bis(trimethylsilyl)aminoalkyl-substituted styrene derivatives disclosed in EP 2 772 515 A1 have a serious drawback, insofar as they are hydrolytically unstable, due to the high reactivity of the (Me$_3$Si)$_2$N—R— group with water, particularly under acidic or basic conditions (compare Org. Lett. 2001, 3, 2729). Thus, the hydrolysis of molecular or macromolecular compounds containing e.g. the moiety (Me$_3$Si)$_2$N—R— leads to the formation of Me$_3$SiOSiMe$_3$, with simultaneous restoration of free H$_2$N—R— groups which in the final rubber composition can interact with the carbon black only by non-covalent bonds and with the silica by hydrogen bonding.

In contrast to those styrene derivatives containing a bis(trialkylsilyl)amine moiety ((R$_3$Si)$_2$N—R—), see e.g. EP 2 772 515 A1, the compounds according to the present invention have a nitrogen atom that is surrounded by three silyl groups, {(R$^5$)$_3$Si}{(R$^4$)$_3$Si}NSiR$^3$R$^2$—(R$^1$)—. The styrene derivatives of the present invention are surprisingly hydrolytically more stable (compare Organometallic Chemistry 2002, 655, 115, teaching (RMe$_2$Si)$_2$NSiMe$_3$ derivatives which were isolated by extraction of the organic layer with an aqueous solution of NH$_4$Cl).

Moreover, when the styrene derivative according to the invention is incorporated into the elastomeric copolymer, as initiator and/or as copolymer, incorporation of additional functionalized comonomer can be reduced, or can even completely be dispensed with.

Further, and in contrast to simple [(R$_3$Si)$_2$N—R-]-functionalized polymers, any partial hydrolysis of groups of the type {(R$^5$)$_3$Si}{(R$^4$)$_3$Si}NSiR$^3$R$^2$—(R$^1$)— in a copolymer as functionalized using the styrene derivative of the present invention will at elevated temperature advantageously lead to the formation of reactive silanol groups (HOSiR$^3$R$^2$—(R$^1$)—). These groups are capable of forming a stable covalent bond with the silica filler through a [(SiO$_2$)O$_3$Si]—O—SiR$^3$R$^2$—(R$^1$)— bond sequence, by the cross-condensation reaction between hydroxyl groups on the silica's surface, [(SiO$_2$)O$_3$Si]—OH, with HOSiR$^3$R$^2$—(R$^1$)-functionalized polymer, compare J. Am. Chem. Soc. 2006, 128, 16266 for molecular trisilylamine derivatives of the type (RMe$_2$Si)$_2$NSiMe$_2$R', used in the modification of the surface of MCM-41. Moreover, the remaining {(R$^5$)$_3$Si}{(R$^4$)$_3$Si}NSiR$^3$R$^2$— (R$^1$)— moieties are capable of interacting with carbon filler (e.g. carbon black) via non-covalent interaction.

In a first aspect, the invention relates to the styrene derivative of Formula (I).

In a second aspect, the invention relates to a method for the preparation of the styrene derivative of Formula (I).

In a third aspect, the invention related to the use of the styrene derivative of Formula (I) in the preparation of a copolymer thereof. The use according to the third aspect is preferably i) as comonomer, or ii) as alkali metal salt derivative, as initiator for the copolymerization, or (most preferably) iii) both as comonomer and as alkali metal salt derivative, as initiator for the copolymerization.

The Styrene Derivative of Formula (I)

The styrene derivative according to the invention is of Formula (I)

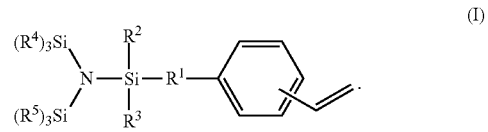

(I)

wherein R$^1$ is selected from the group consisting of:
a) a single bond;
b) —(CH$_2$)$_n$—, wherein n represents an integer from 1 to 12;
c) —(CH$_2$CH$_2$Y)$_n$—, wherein n represents an integer from 1 to 12, and Y can independently be oxygen or sulfur;
d) —CH$_2$—(CH$_2$CH$_2$Y)$_n$—CH$_2$—, wherein n represents an integer from 1 to 12, and Y can independently be oxygen or sulfur;
e) —(CH$_2$CH$_2$NR)$_n$—, wherein n represents an integer from 1 to 12, and R can independently represent an alkyl group containing from 1 to 10 carbon atoms, or an aryl or aralkyl group containing from 6 to 10 carbon atoms;
f) —CH$_2$—(CH$_2$CH$_2$NR)$_n$—CH$_2$—, wherein n represents an integer from 1 to 12, and R can independently represent an alkyl group containing from 1 to 10 carbon atoms, or an aryl or aralkyl group containing from 6 to 10 carbon atoms;

R$^2$, R$^3$ can be the same or different and represent an alkyl group containing from 1 to 10 carbon atoms, or an aryl or aralkyl group containing from 6 to 10 carbon atoms; and R$^4$ and R$^5$ can be the same or different, and each R$^4$ and R$^5$ independently represents an alkyl group containing from 1 to 10 carbon atoms, or an aryl or aralkyl group containing from 6 to 10 carbon atoms.

In a preferred embodiment of the first aspect, the styrene derivative is a para or meta isomer, i.e. is of Formula (Ia) or (Ib)

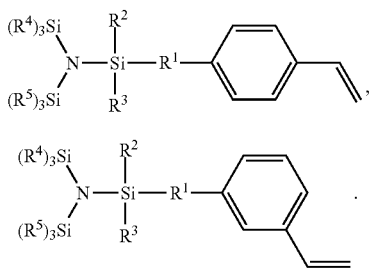

It is further preferred that the styrene derivative of Formula (I) has $R^1$ selected from the group consisting of:
a) a single bond; and
b) —$(CH_2)_n$—, wherein n represents an integer from 1 to 12.

More preferably, $R^1$ is b) —$(CH_2)_n$—, wherein n represents an integer from 1 to 5, preferably n represents an integer from 1 to 3, in particular n is 1, i.e. $R^1$ is —$(CH_2)$—.

Preferred styrene derivatives of this type are selected from any one of formulae (1), (2), (3), (4), (5), and (6)

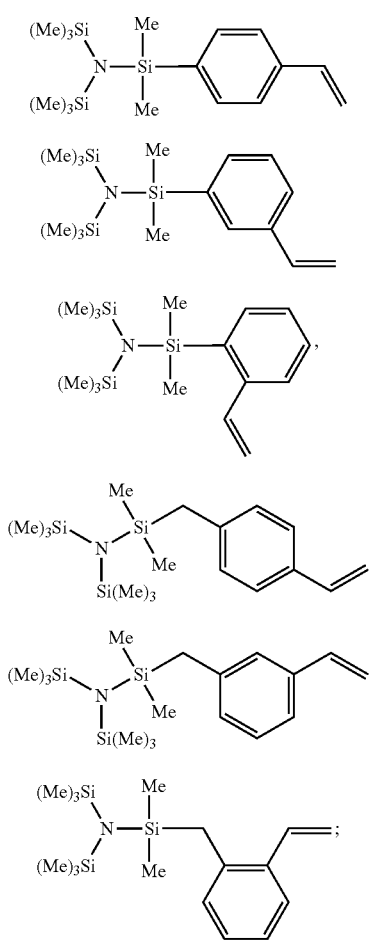

more preferably the styrene derivative of Formula (I) is selected from any one of formulae (1), (2), (4), and (5); most preferably the styrene derivative of Formula (I) is selected from any one of formulae (4) and (5).

Also, it is preferred according to the invention that $R^2$ and $R^3$ are the same or different and represent $CH_3$ or $C_6H_5$, and it is more preferred that $R^2$ and $R^3$ are the same and represent $CH_3$. It is most preferred that $R^4$ and $R^5$ all represent $CH_3$, more preferably the styrene derivative is of Formula (4) or (5) above.

Thus, the present invention in particular provides the following [bis(trimethylsilyl)amino]-functionalized styrenes:
N-(dimethyl(4-vinylbenzyl)silyl)-N,N-bis(trimethylsilyl) amine with the Formula (4), and
N-(dimethyl(3-vinylbenzyl)silyl)-N,N-bis(trimethylsilyl) amine with the Formula (5).

In a second aspect, the invention relates to a method for the preparation of a styrene derivative of Formula (I) above, wherein a halogenosilane of Formula (II)

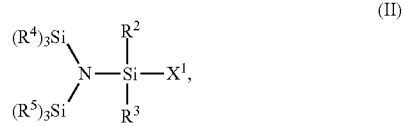

wherein $X^1$ is selected from chlorine, bromine, and iodine atoms, and $R^2$, $R^3$, $R^4$ and $R^5$ are as defined above, is reacted with a magnesium compound of Formula (III),

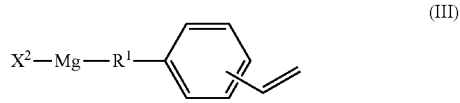

wherein $X^2$ is selected from chlorine, bromine, and iodine atoms, and $R^1$ is as defined above.

Preferably, the reaction is performed in an organic solvent in an inert gas atmosphere, more preferably the reaction is performed in an aliphatic or cyclic ether solvent (and in particular, the solvent is tetrahydrofuran, THF).

With regard to the preparation of the halogenosilane of Formula (II), reference is made for example to J. Organomet. Chem. 556 (1998) 67-74, and U.S. Pat. No. 3,253,008.

The organomagnesium compound with the Formula (III) can be formed in situ either in the medium of the reaction between a halogenofunctional styrene with the general Formula (IV),

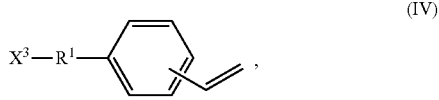

where $X^3$ is selected from chlorine, bromine, and iodine atoms, and magnesium in the presence of a halogenosilane with the Formula (II), or can be introduced to the reaction medium (as a halogenosilane having the Formula (II) as a ready-to-use reagent prepared in a separate reactor).

Due to the instability of the magnesium compound of Formula (III), it is advantageous to conduct the reaction sequentially, i.e. to load the reactor with magnesium, the solvent (in any amount of e.g. about 10% of the required volume) and an activating agent ($I_2$, 1,2-dibromoethane, however most advantageously diisobutylaluminium hydride (DIBAH) in an amount of e.g. about 0.01 mole per one mole of magnesium). The advantage of using DIBAH is that this activating agent does not, in contrast to iodine, initiate polymerization of the monomer product and that it allows conducting the activation under mild conditions. During the activation of the magnesium surface with DIBAH, the reactor contents should be stirred until hydrogen evolution completes. Then, the halogenosilane with the Formula (II) and subsequently the remaining part of the solvent are introduced to such a prepared system at room temperature. This is followed by the introduction of halogeno ($X^3$)-functional styrene with the general Formula (IV), which is introduced step-by-step over a time period of 10 to 13 hours. The reaction proceeds at any ratio of reactants, however, in the case of a stoichiometric excess of halogenosilane of Formula (II), side products may be formed. It is thus advantageous to conduct the reaction of the invention at a 5 to 10 mole % excess of magnesium and at a 2 to 6 mole % excess of halogenofunctional styrene with the general Formula (III), each in relation to the halogenosilane of Formula (II). The said reaction is preferably conducted at a temperature in the range of from 20° C. to 35° C., optimally at about 25° C.

The synthesis according to the second aspect of the invention is preferably carried out in a moisture-protected reactor, most advantageously in an argon or nitrogen atmosphere. The materials are introduced into the reactor sequentially, i.e. during the phase of magnesium surface activation the magnesium is introduced first, followed by the solvent and then by DIBAH, whereas during the reaction phase the sequence of the introduction (preferably at room temperature) is: halogenosilane (II) and then halogenofunctional styrene (IV). All liquid reagents, as well as the solvent, should preferably be dry and deoxygenated, to avoid the possibility of decomposition of halogenosilane (II) and organomagnesium compound (III) in the presence of any trace amounts of water and oxygen. Then the reaction mixture is heated and stirred until the reaction is completed.

The opposite sequence of introducing reagents to the activated magnesium-containing reactor, i.e. first the introduction of halogenofunctional styrene (with the general Formula (IV)) and then halogenosilane (II), is also possible, but it can lead to a decrease in the desirable product yield as a result of partial polymerization of the compounds with the general formulas (III) and (IV).

The raw product of the reaction according to the second aspect of the invention may be subjected to isolation by known methods. Generally, the isolation consists in evaporating the solvent from the post-reaction mixture, followed by the separation of the product from magnesium halide $MgX^1X^2$ (that is formed as a side product of the reaction), and subjecting the obtained suspension to filtering or centrifuging. Separation is typically performed by extraction with an aliphatic hydrocarbon, advantageously with hexane or cyclohexane. The product may be recovered from the filtrate by evaporating the solvent and volatile impurities under reduced pressure.

Compounds obtained according to the invention are applied as comonomeric substrates for obtaining styrene-butadiene rubbers with unique physicochemical properties. Thus, in a third aspect, the invention relates to the use of the styrene derivative of Formula (I) in the preparation of a copolymer thereof.

Preferably, the copolymer comprises repeat units that are derived from
A) 20 wt. % to 99.95 wt. %, by weight of the copolymer, of one or more diene monomer(s);
B) 0 wt. % to 60 wt. %, by weight of the copolymer, of one or more vinyl aromatic monomers; and
C) 0.05 wt. % to 50 wt. %, by weight of the copolymer, of one or more styrene derivatives of Formula (I) above.

Alternatively, the styrene derivative of Formula (I) is used in the preparation of a polymerization initiator. In this embodiment, an alkali metal salt derivative of the styrene derivative of Formula (I) is used as initiator for the copolymerization of i) one or more conjugated diene monomers and optionally ii) one or more vinyl aromatic monomers, and the alkali metal is selected from lithium, sodium, and potassium.

Further details of the use of the styrene derivative of the invention are disclosed in the application entitled "Elastomeric copolymers based on [bis(trihydrocarbylsilyl)aminosilyl]-functionalized styrene and their use in the preparation of rubbers" (attorney reference P103151, PCT application no. PCT/EP2017/075262), filed on Oct. 4, 2017, the disclosure of which application is incorporated herein in its entirety. Said application entitled "Elastomeric copolymers based on [bis(trihydrocarbylsilyl)aminosilyl]-functionalized styrene and their use in the preparation of rubbers" claims priority from European patent application EP16461560.1 filed Oct. 6, 2016, which is also the filing date of European patent application EP16461559.3 (from which the present application claims priority).

The subject matter of the invention is presented in more detail in the examples, which illustrate, but do not limit, the invention.

EXAMPLES

Example 1

A reactor of 2 L capacity, equipped with a magnetic stirrer, a dropping funnel and a gas introduction attachment with an oil valve (Zaitsev washer), was loaded in nitrogen atmosphere with magnesium metal (14.0 g, 0.58 mole), followed by addition of dry and deoxygenated tetrahydrofuran (THF, 890 mL) and $I_2$ (0.73 g, 2.9 mmole). The mixture obtained was refluxed until change of the color from brown to pale-yellow, then it was cooled down to 25° C. Next, N-(chlorodimethylsilyl)-N,N-bis(trimethylsilyl)amine ($ClMe_2SiN(SiMe_3)_2$) (140.00 g, 0.55 mole) and the remaining part (280 mL) of the solvent were added to such a prepared activated magnesium. The syringe placed in a syringe pump was filled with 4-vinylbenzyl chloride (para-VBC) (85.92 g, 0.56 mole). VBC was added dropwise into the mixture for 10 hours, at 25° C. After the dosing of VBC was completed, the reactor temperature was maintained in the range of 40° C. for one hour, followed by cooling to room temperature. Then the solvent was evaporated from the post-reaction mixture under reduced pressure and 1.00 L of hexane (mixture of isomers) was added to the residue. The obtained suspension was filtered off and the precipitate was washed with three portions of hexane of 200 mL each. Then the solvent was evaporated from the obtained filtrate under reduced pressure, followed by drying in a vacuum at 40° C. until a constant pressure was achieved. 165.00 g of N-(dimethyl(vinylbenzyl)silyl)-N,N-bis(trimethylsilyl)amine were obtained with the yield of 89%. The product was subjected to spectroscopic analysis.

Example 2

A reactor of 2 L capacity, equipped with a magnetic stirrer, a dropping funnel and a gas introduction attachment with an oil valve (Zaitsev washer), was loaded in nitrogen atmosphere with magnesium metal (14.0 g, 0.58 mole), followed by addition of dry and deoxygenated tetrahydrofuran (THF, 890 mL) and 1,2-dibromoethane (1.1 g, 5.8 mmole). The mixture obtained was refluxed until ethylene evolution completes, then it was cooled down to 25° C. Next, N-(chlorodimethylsilyl)-N,N-bis(trimethylsilyl)amine (ClMe$_2$SiN(SiMe$_3$)$_2$) (140.00 g, 0.55 mole) and the remaining part (280 mL) of the solvent were added to such a prepared activated magnesium. The syringe placed in a syringe pump was filled with 4-vinylbenzyl chloride (para-VBC) (85.92 g, 0.56 mole). The para-VBC was added dropwise into the mixture for 10 hours, at 25° C. After the dosing of VBC was completed, the reactor temperature was maintained in the range of 40° C. for one hour, followed by cooling to room temperature. Then the solvent was evaporated from the post-reaction mixture under reduced pressure and 1.00 L of hexane (mixture of isomers) was added to the residue. The obtained suspension was filtered off and the precipitate was washed with three portions of hexane of 200 mL each. Then the solvent was evaporated from the obtained filtrate under reduced pressure, followed by drying in a vacuum at 40° C. until a constant pressure was achieved. 161.50 g of N-(dimethyl(vinylbenzyl)silyl)-N,N-bis(trimethylsilyl)amine were obtained with the yield of 87%. The product was subjected to spectroscopic analysis.

Example 3

Acting in the same manner as in Example 1, N-(chlorodimethylsilyl)-N,N-bis(trimethylsilyl)amine (ClMe$_2$SiN(SiMe$_3$)$_2$) (140.00 g, 0.55 mole) was reacted with vinylbenzyl chloride VBC (mixture of 43% para- and 57% of meta-isomer) (85.92 g, 0.56 mole) in the presence of magnesium metal (14.0 g, 0.58 mole) activated with I$_2$ (0.73 g, 2.9 mmole). 165 g of N(dimethyl(vinylbenzyl)silyl)-N,N-bis(trimethylsilyl)amine was obtained with the yield of 89%. The product was subjected to spectroscopic analysis.

Example 4

A reactor of 2 L capacity, equipped with a magnetic stirrer, a dropping funnel and a gas introduction attachment with an oil valve (Zaitsev washer), was loaded in nitrogen atmosphere with magnesium metal (14.0 g, 0.58 mole), followed by addition of dry and deoxygenated tetrahydrofuran (THF, 890 mL) and DIBAH((i-Bu)$_2$AlH), 0.8 g, 5.62 mmole). This was followed by stirring of the reactor contents at 25° C. The activation of magnesium was conducted until hydrogen evolution completes. Then N-(chlorodimethylsilyl)-N,N-bis(trimethylsilyl)amine (140.00 g, 0.55 mole) and the remaining part (280 mL) of the solvent were added to such a prepared activated magnesium. The syringe placed in a syringe pump was filled with vinylbenzyl chloride VBC (mixture of 43% para- and 57% of meta-isomer) (85.92 g, 0.56 mole). VBC was added dropwise into the mixture for 10 hours, at 25° C. After the dosing of VBC was completed, the reactor temperature was maintained in the range of 40° C. for one hour, followed by cooling to room temperature. Then the solvent was evaporated from the post-reaction mixture under reduced pressure and 1.00 L of hexane (mixture of isomers) was added to the residue. The obtained suspension was filtered off and the precipitate was washed with three portions of hexane of 200 mL each. Then the solvent was evaporated from the obtained filtrate under reduced pressure, followed by drying in a vacuum at 40° C. until a constant pressure was achieved. 180.00 g of N-(dimethyl(vinylbenzyl)silyl)-N,N-bis(trimethylsilyl)amine were obtained with the yield of 97%. The product was subjected to spectroscopic analysis.

Example 5

A jacketed reactor of 500 L capacity, equipped with a paddle stirrer, a metering system with piston pump and a reflux condenser equipped with a gas introduction attachment, was loaded in nitrogen atmosphere with magnesium metal (3.89 kg, 0.16 kmole), followed by addition of dry and deoxygenated tetrahydrofuran (THF, 247.00 L) and DIBAH ((i-Bu)$_2$AlH, 0.22 kg, 1.56 mole). This was followed by stirring of the reactor contents at 25° C. The activation of magnesium was conducted until hydrogen evolution completes (ca. 15 min). Then, N-(chlorodimethylsilyl)-N,N-bis(trimethylsilyl)amine (ClMe$_2$SiN(SiMe$_3$)$_2$) (38.90 kg, 0.15 kmole) and the remaining part (78.00 L) of the solvent were added to such a prepared activated magnesium. Then, dozing of VBC (mixture of 43% para- and 57% of meta-isomer, 23.9 kg, 0.16 kmole), was started and was continued for 10 hours at 25° C. After the dosing of vinylbenzyl chloride was completed, the reactor temperature was maintained at about 40° C. for one hour, followed by cooling to room temperature. Then the solvent was evaporated from the post-reaction mixture under reduced pressure and 277.00 L of hexane was added to the residue. The obtained suspension was filtered off in a Nutsche filter and the precipitate was washed with three 55 L portions of hexane. Then the solvent was evaporated from the obtained filtrate under reduced pressure, followed by drying in a vacuum at 40° C. until a constant pressure was achieved. 50 kg of N(dimethyl(vinylbenzyl)silyl)-N,N-bis(trimethylsilyl)amine were obtained with a yield of 97%.

Example 6

A reactor of 1 L capacity, equipped with a magnetic stirrer, a dropping funnel and a gas introduction attachment with an oil valve (Zaitsev washer), was loaded in nitrogen atmosphere with magnesium metal (3.5 g, 0.145 mole), followed by addition of dry and deoxygenated tetrahydrofuran (THF, 200 mL) and DIBAH((i-Bu)$_2$AlH), 0.2 g, 1.405 mmole). This was followed by stirring of the reactor contents at 25° C. The activation of magnesium was conducted until hydrogen evolution completes. Then, N-(chlorodimethylsilyl)-N,N-bis(trimethylsilyl)amine (35.00 g, 0.137 mole) and the remaining part (70 mL) of the solvent were added to such a prepared activated magnesium. The syringe placed in a syringe pump was filled with 4-bromostyrene (25.6 g, 0.14 mole). The 4-bromostyrene was added dropwise into the mixture for 10 hours, at 25° C. After the dosing of VBC was completed, the reactor temperature was maintained in the range of 40° C. for one hour, followed by cooling to room temperature. Then the solvent was evaporated from the post-reaction mixture under reduced pressure and 0.25 L of hexane (mixture of isomers) was added to the residue. The obtained suspension was filtered off and the precipitate was washed with three portions of hexane of 50 mL each. Then, the solvent was evaporated from the obtained filtrate under reduced pressure, followed by drying in a vacuum at room temperature, until a constant pressure was achieved. The GCMS analysis of the residue revealed 28% yield of the desired product, (N-(dimethyl(4-vinylphenyl)silyl)-N,N-bis(trimethylsilyl)amine.

Products 1 to 6 were analyzed using:
- $^1$H, and $^{13}$C, $^{29}$Si NMR spectra, recorded with the use of NMR spectrometers of the types Bruker Ultra Shield 400 MHz,
- GC-MS mass spectrometers of the types Bruker MS320 and GC-MS Varian Saturn 2000.

Shown in Table 1 are data obtained by NMR spectroscopy or GCMS analysis.

In order to provide more details about the synthesis and properties of elastomers prepared in accordance with the teaching of the present invention, functionalized styrene-butadiene copolymers with exactly controlled micro- and macrostructure and with functional groups of various types are described in Examples A2 to A4 below, and are compared with a non-functionalized copolymer as described in Comparative Example A1. "Parts per hundred rubber", "phr", and "%" are based on mass unless otherwise specified. The measurement methods and evaluation methods of properties are shown further below.

TABLE 1

Characterization of the compounds obtained in the Examples.

| Ex. | NMR analysis or MS data |
|---|---|
| 1, 2 | $^1$H NMR (400 MHz, CDCl$_3$, 300 K) δ(ppm) = 7.26 (d, $^3J_{H-H}$ = 8.0 Hz, 2H, —C$_6$H$_4$—); 6.99 (d, $^3J_{H-H}$ = 8.0 Hz, 2H, —C$_6$H$_4$—); 6.67 (dd, 1H, —CH=); 5.66 (dd, 1H, =CH$_2$) ; 5.13 (dd, 1H, =CH$_2$) ; 2.22 (s, 2H, —CH$_2$—) , 0.19 (s, 18H, —N(SiMe$_3$)$_2$); 0.15 (s, 6H, —SiMe$_2$—). $^{13}$C NMR (100.63 MHz, CDCl$_3$, 300 K) δ(ppm) = 140.44; 137.08; 133.73; 128.80; 126.22; 112.17; 30.69; 5.87; 3.64. $^{29}$Si NMR (79.49 MHz, CDCl$_3$, 300 K) δ(ppm) = 2.96 (—N(SiMe$_3$)$_2$); 1.54 (—SiMe$_2$—). |
| 3, 4, 5 | para-isomer $^1$H NMR (400 MHz, CDCl$_3$, 300 K) δ(ppm) = 7.26 (d, $^3J_{H-H}$ = 8.0 Hz, 2H, —C$_6$H$_4$—); 6.99 (d, $^3J_{H-H}$ = 8.0 Hz, 2H, —C$_6$H$_4$—); 6.67 (dd, 1H, —CH=); 5.66 (dd, 1H, =CH$_2$); 5.13 (dd, 1H, =CH$_2$); 2.22 (s, 2H, —CH$_2$—), 0.19 (s, 18H, —N(SiMe$_3$)$_2$); 0.15 (s, 6H, —SiMe$_2$—). $^{13}$C NMR (100.63 MHz, CDCl$_3$, 300 K) δ(ppm) = 140.44; 137.08; 133.73; 128.80; 126.22; 112.17; 30.69; 5.87; 3.64. $^{29}$Si NMR (79.49 MHz, CDCl$_3$, 300 K) δ(ppm) = 2.95 (—N(SiMe$_3$)$_2$); 1.54 (—SiMe$_2$—). meta-isomer $^1$H NMR (400 MHz, CDC1$_3$, 300 K) δ(ppm) = 7.13 (m, 2H, —C$_6$H$_4$—); 7.06 (bs, 1H, —C$_6$H$_4$—); 6.92 (d, 1H, —C$_6$H$_4$—); 6.66 (dd, 1H, —CH=); 5.70 (dd, 1H, =CH$_2$); 5.19 (dd, 1H, =CH$_2$); 2.20 (s, 2H, —CH$_2$—), 0.17 (s, 18H, —N(SiMe$_3$)$_2$); 0.14 (s, 6H, —SiMe$_2$—). $^{13}$C NMR (100.63 MHz, CDCl$_3$, 300 K) δ(ppm) = 140.68; 137.43; 128.41; 128.34; 126.62; 122.25; 113.43; 30.66; 5.86; 3.72. $^{29}$Si NMR (79.49 MHz, CDCl$_3$, 300 K) δ(ppm) = 2.98 (—N(SiMe$_3$)$_2$); 1.46 (—SiMe$_2$—). |
| 6 | MS (EI, 75 eV) m/z(%) = 307.8(16.4); 306.8 (30.7)(M-15); 305.8(100); 289.8(10.6); 263.8(21.4); 236.8(10.1); 235.8(30.1); 219.9(11.8); 218.8(15.1); 217.9(45.1); 161.0(14.0); 147.0(10.2); 146.1(12.8); 145.0(10.3); 132.0(13.5); 130.1(16.7); 73.1(25.6). |

Polymerization

Inertization Step:

Cyclohexane (1,200 g) was added to a nitrogen-purged two liter reactor and treated with 1 gram of 1.6 M n-butyl lithium solution in cyclohexane. The solution was heated to 70° C. and vigorously stirred for 10 minutes to perform cleaning and inertization of the reactor. After that, solvent was removed via a drain valve and nitrogen was purged again.

Example A1 (Comparative)

Cyclohexane (820 g) was added to the inerted two liter reactor, followed by addition of styrene (31 g) and of 1,3-butadiene (117 g). Inhibitor from styrene and 1,3-butadiene was removed. Next, tetramethylethylenediamine (TMEDA, 2.21 mmol) was added, to provide random incorporation of styrene monomer and to increase the vinyl content of the butadiene units. The solution inside the reactor was heated to 60° C. and continuously stirred during the whole process. When the desired temperature was reached, n-butyl lithium (0.045 mmol) was added to perform quenching of residual impurities. Then, n-butyl lithium (0.845 mmol) was added to initiate the polymerization process. The reaction was carried out as a isothermic process for 60 minutes. After this time, silicon tetrachloride (5.25× $10^{-5}$ mol) was added to the polymer solution as a coupling agent. Coupling was performed for 5 minutes. The reaction solution was terminated using nitrogen-purged isopropyl alcohol (1 mmol) and rapidly stabilized by addition of 2-methyl-4,6-bis(octylsulfanylmethyl)phenol (at 1.0 phr polymer). The polymer solution was treated with isopropanol, and precipitation of polymer occurred. The final product was dried overnight in a vacuum oven.

Example A2 (Styrene Derivate as Comonomer)

Cyclohexane (820 g) was added to the inerted two liter reactor, followed by addition of styrene (31 g), N(dimethyl (vinylbenzyl)silyl)-N,N-bis(trimethylsilyl)amine 50/50 by weight mixture of isomers of formula (4) and (5) (0.6 g) and 1,3-butadiene (117 g). Inhibitor from styrene and 1,3-butadiene was removed. Next, 2,2-Bis(2-tetrahydrofuryl)propane (DTHFP, 2.52 mmol) was added, to provide random incorporation of styrene monomer and to increase the vinyl content of the butadiene units. The solution inside the reactor was heated to 60° C. and continuously stirred during the whole process. When the desired temperature was reached, n-butyl lithium (0.045 mmol) was added to perform quenching of residual impurities. Then, n-butyl lithium (0.84 mmol) was added to initiate the polymerization process. The reaction was carried out as a isothermic process for 60 minutes. After this time, silicon tetrachloride (6.30×$10^{-5}$ mol) was added to the polymer solution as a coupling agent. Coupling was performed for 5 minutes. The reaction solution was terminated using of nitrogen-purged isopropyl alcohol (1 mmol) and rapidly stabilized by addition of 2-methyl-4,6-bis(octylsulfanylmethyl)phenol (at 1.0 phr polymer). The polymer solution was treated with isopropanol, and precipitation of polymer occurred. The final product was dried overnight in a vacuum oven.

Example A3 (Styrene Derivates as Both Initiator Component and as Comonomer)

Cyclohexane (820 g) was added to the inerted two liter reactor, followed by addition of styrene (31 g), N-(dimethyl (vinylbenzyl)silyl)-N,N-bis(trimethylsilyl)amine 50/50 by weight mixture of isomers of formula (4) and (5) (0.6 g) and 1,3-butadiene (117 g). Inhibitor from styrene and 1,3-butadiene was removed. Next, 2,2-Bis(2-tetrahydrofuryl)propane (DTHFP, 3.69 mmol) was added as a styrene randomizer and to increase the vinyl content of the butadiene monomercontributed units. The solution inside the reactor was heated to 60° C. and continuously stirred during the whole process. When the temperature was reached, n-butyl lithium (0.045 mmol) was added to the reactor, to perform quenching of residual impurities.

n-BuLi (1.23 mmol) and N-(dimethyl(vinylbenzyl)silyl)-N,N-bis(trimethylsilyl)amine 50/50 by weight mixture of isomers of formula (4) and (5) (0.4 g) were mixed together in a burette, the contact time was about 15 min, and then the mixture was added to initiate the polymerization process. The reaction was carried out over 60 minutes, as an isothermic process. After this time, silicon tetrachloride ($6.30 \times 10^{-5}$ mol) was added to the polymer solution as a coupling agent. Coupling was performed for 5 minutes. The reaction solution was terminated using nitrogen-purged isopropyl alcohol (1 mmol) and rapidly stabilized by addition of 2-methyl-4,6-bis(octylsulfanylmethyl)phenol (at 1.0 phr polymer). The polymer solution was treated with isopropanol, and precipitation of polymer occurred. The final product was dried overnight in a vacuum oven.

Example A4 (Continuous Polymerization)

The butadiene-styrene copolymer was prepared in a continuous reactor chain of three reactors having a volume of 10 L (reactor 1), 20 L (reactor 20) and 10 L (reactor 3), respectively, where each reactor was equipped with a paddle stirrer. The agitation speed was 150-200 rpm and filling factor at the level of 50%-60%. Hexane, styrene, 1,3-butadiene, 1,2-butadiene (gel formation prevention additive), DTHFP and N(dimethyl(vinylbenzyl)silyl)-N,N-bis(trimethylsilyl)amine 50/50 by weight mixture of isomers of formula (4) and (5) (the last three reactants as a solutions in hexane) were dosed into the first reactor, with flow rates of 10752.00 g/h, 398.00 g/h, 1499.00 g/h, 19.00 g/h, 102 g/h and 48.00 g/h, respectively. n-Butyl lithium flow rate (n-BuLi, as a solution in hexane) was 107.00 g/h, and N-(dimethyl(vinylbenzyl)silyl)N,N-bis(trimethylsilyl) amine (as a solution in hexane) flow rate was 105.00 g/h. Streams of n-BuLi and 50/50 by weight mixture of isomers of silanamine of formula (4) and (5) were mixed together in the pipe, before entering the reactor, and the contact time was about 15 min. The temperature in the reactors was between 70° C. to 85° C. To obtain branched rubber silicon tetrachloride was added at the reactor 3 inlet, at the entry of static mixer, in a $SiCl_4$/active n-BuLi ratio 0.05. The coupling reaction was performed at 70-85° C. At the reactor 3 outlet, 2-methyl-4,6-bis(octylsulfanylmethyl)phenol (as a solution in hexane) was added as an antioxidant (142 g/h). The polymers were recovered by a conventional recovery operation using steam stripping of the solvent, were dried in a screw-type dewatering system at 70° C., and then dried for 40 minutes in the dryer.

Characterization of Samples A1 to A4

Vinyl Content (%)
  Determined by 600 MHz $^1$H-NMR, based on BS ISO 21561:2005

Bound Styrene Content (%)
  Determined by 600 MHz $^1$H-NMR, based on BS ISO 21561:2005

Molecular Weight Determination
  Gel Permeation Chromatography was Performed Via PSS Polymer Standards Service multiple columns (with guard column) using THF as the eluent and for sample preparation. Multiangle laser light scattering measurements were carried out using a Wyatt Technologies Dawn Heleos II light scattering detector, DAD (PDA) Agilent 1260 Infinity UV-VIS detector and Agilent 1260 Infinity refractive index detector.

Glass Transition Temperature (° C.)
  Determined based on PN-EN ISO 11357-1:2009

Mooney Viscosity (ML (1+4)/100° C.)
  Determined based on ASTM D 1646-07, using an large rotor under the conditions of preheating=1 minute, rotor operating time=4 minutes, and temperature=100° C.

Vulcanization Characteristics
  Determined based on ASTM D6204, using RPA 2000 Alpha Technologies rubber processing analyzer, operating time=30 minutes, and temperature=170° C.

Evaluation and Measurement of Properties of Rubber Composition

A vulcanized rubber compound was prepared using a polymer obtained in each of Examples A1 to A4, and was measured for the following test parameters
  i) Tire predictors (tan δ at 60° C., tan δ at 0° C., tan δ at −10° C.)
  A vulcanized rubber compound was used as a test sample and measured for this parameter, using a dynamic mechanical analyzer (DMA 450+ MetraviB) in single shear mode under the conditions of dynamic strain=2%, frequency=10 Hz, in the temperature range of from −70 to 70° C., with a heating rate of 2.5 K/min.
  ii) Rebound resilience
  Determined based on ISO 4662

Table A1 shows the characterization results for the four samples synthesized for this study.

TABLE A1

| Example | $M_n$ [g/mol] | $M_w$ [g/mol] | $M_w/M_n$ | Vinyl content [%][1] | Styrene content [%] | Mooney | Tg [° C.] |
|---------|---------------|---------------|-----------|----------------------|---------------------|--------|-----------|
| A1 (comp.) | 223,000 | 323,000 | 1.44 | 61.90 | 20.45 | 60.4 | −26.8 |
| A2 | 225,000 | 319,500 | 1.42 | 61.82 | 20.90 | 55.4 | −24.3 |
| A3 | 226,000 | 329,900 | 1.46 | 62.70 | 21.36 | 60.2 | −25.1 |
| A4 | 184,000 | 260,900 | 1.76 | 62.53 | 21.58 | 52.1 | −23.5 |

[1]Based on 1,3-butadiene content

Compounding

Using the rubbers obtained in Examples A2, A3, A4 and Comparative Example A1, respectively, compounding was made according to the "compounding recipe of rubber composition" shown in Table A2. The compounding of the solution styrene-butadiene rubber, fillers, and rubber additives was performed in a Banbury type of internal mixer (350E Brabender GmbH& Co. KG) and on a lab sized two roll mill. The rubber compounds were mixed in two different stages and the final pass was completed on a two roll mill. The first stage was used to mix the polymer with oil, silica, silane coupling agent, 6PPD and activators in several steps. The second stage was to further improve the distribution of the silica along with adding of carbon black, then the compound was allowed to sit for 24 hours. In order to be conditioned for the final pass, the rubber compound was allowed to condition for four hours. The final mixing was performed on a two roll mill. The last step was used to add the cure packages. Then, each compound was vulcanized at 170° C., for $T_{95+1.5}$ minutes (based on RPA results), to obtain vulcanizates. Each vulcanized rubber compound was evaluated and measured for the above-mentioned curing characteristics, tire predictors and rebound resilience. The results are shown in Table A3.

TABLE A2

| Component | phr |
| --- | --- |
| SBR | 75 |
| Polybutadiene rubber[1] | 25 |
| Silica[2] | 80 |
| Carbon Black[3] | 10 |
| Stearic acid | 2 |
| Zinc oxide | 3 |
| Oil extender[4] | 37.5 |
| 6PPD[5] | 2 |
| Bis[3-(triethoxysilyl)propyl]tetrasulfide[6] | 6.4 |
| N-tert-butyl-2-benzothiazole sulfenamide[7] | 1.7 |
| 1,3-Diphenylguanidine[8] | 2 |
| Sulphur | 1.5 |

[1]Synteca 44, a product of Synthos
[2]Zeosil 1165MP, a product of Solvay
[3]ISAF-N234, a product of Cabot corporation
[4]VivaTec 500, a product of Klaus Dahleke KG
[5]VULKANOX 4020/LG, a product of Lanxess
[6]Si 69, a product of Evonik
[7]LUVOMAXX TBBS, a product of Lehmann & Voss & Co. KG
[8]DENAX, a product of Draslovka a.s.

TABLE A3

| Example | Rebound resilience (23° C.), [%] | Rebound resilience (70° C.), [%] | tan δ (60° C.) | tan δ, (0° C.) | tan δ, (−10° C.) |
| --- | --- | --- | --- | --- | --- |
| A1 (comp.) | 31.0 | 56.0 | 0.182 | 0.5082 | 0.6540 |
| A2 | 34.0 | 62.0 | 0.142 | 0.6455 | 0.7446 |
| A3 | 37.0 | 67.0 | 0.132 | 0.6567 | 0.7796 |
| A4 | 37.0 | 66.0 | 0.144 | 0.6690 | 0.9228 |

It is apparent from these results that in a silica mix, as judged based on the properties in the vulcanized state, SSBR A3 in accordance with the teaching of the invention imparts to the corresponding rubber composition A3 reinforcement properties which are superior to those obtained with the control SSBR A1 and with the other SSBR A2 in accordance with the teaching of the invention. Moreover, the data in Table A3 shows that SSBR A4 obtained in continuous polymerization has better reinforcement properties compared to control SSBR A1 and to SSBR A2.

Furthermore, the tire predictors of rubber composition A3 in accordance with the teaching of the invention are improved relative to those of the control rubber composition A1 and of the rubber compositions A2 and A4 (in terms of rolling resistance) in accordance with the teaching of the invention. Moreover, said tire predictors are improved for rubber composition A2 in accordance with the teaching of the invention relative to the control rubber composition A1. Furthermore tire predictors are improved for rubber composition A4 in accordance with the teaching of the invention relative to the control rubber composition A1 additionally ice traction and dry traction properties are improved relative to those of the rubber composition A1, A2 and A3.

While certain representative embodiments and details have been shown for the purpose of illustrating the subject invention, it will be apparent to those skilled in this art that various changes and modifications can be made therein without departing from the scope of the subject invention, which scope is defined by the following claims.

The invention claimed is:

1. A styrene derivative of Formula (I)

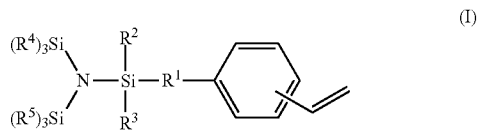

wherein $R^1$ is selected from the group consisting of:
a) a single bond;
b) —$(CH_2)_n$—, wherein n represents an integer from 1 to 12;
c) —$(CH_2CH_2Y)_n$—, wherein n represents an integer from 1 to 12, and Y can independently be oxygen or sulfur;
d) —$CH_2$—$(CH_2CH_2Y)_n$—$CH_2$—, wherein n represents an integer from 1 to 12, and Y can independently be oxygen or sulfur;
e) —$(CH_2CH_2NR)_n$—, wherein n represents an integer from 1 to 12, and R can independently represent an alkyl group containing from 1 to 10 carbon atoms, or an aryl or aralkyl group containing from 6 to 10 carbon atoms;
f) —$CH_2$—$(CH_2CH_2NR)_n$—$CH_2$—, wherein n represents an integer from 1 to 12, and R can independently represent an alkyl group containing from 1 to 10 carbon atoms, or an aryl or aralkyl group containing from 6 to 10 carbon atoms;
$R^2$, $R^3$ can be the same or different and represent an alkyl group containing from 1 to 10 carbon atoms, or an aryl or aralkyl group containing from 6 to 10 carbon atoms; and
$R^4$ and $R^5$ can be the same or different, and each $R^4$ and $R^5$ independently represents an alkyl group containing from 1 to 10 carbon atoms, or an aryl or aralkyl group containing from 6 to 10 carbon atoms.

2. The styrene derivative of claim 1, which is of Formula (Ia) or (Ib)

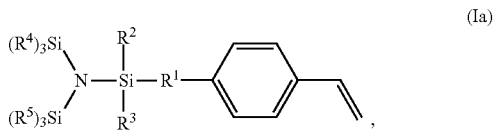

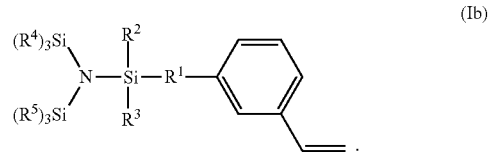

3. The styrene derivative of claim 1, wherein $R^1$ is selected from the group consisting of:
a) a single bond; and
b) —$(CH_2)_n$—, wherein n represents an integer from 1 to 12.

4. The styrene derivative of claim 3, wherein $R^1$ is —$(CH_2)_n$—, wherein n represents an integer from 1 to 5.

5. The styrene derivative of claim 1, wherein $R^2$ and $R^3$ can be the same or different and represent $CH_3$ or $C_6H_5$.

6. The styrene derivative of claim 1, wherein $R^4$ and $R^5$ all represent $CH_3$.

7. A method of producing an elastomeric copolymer, the method comprising copolymerizing one or more diene monomers in the presence of the styrene derivative of claim 1.

8. The method of claim 7, wherein the copolymer comprises repeat units that are derived from
A) 20 wt. % to 99.95 wt. %, by weight of the copolymer, of one or more diene monomers;
B) 0 wt. % to 60 wt. %, by weight of the copolymer, of one or more vinyl aromatic monomers; and
C) 0.05 wt. % to 50 wt. %, by weight of the copolymer, of one or more styrene derivatives of Formula (I)

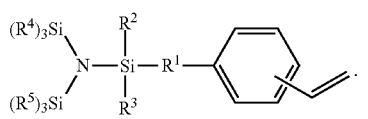
(I)

9. The method of claim 7, wherein an alkali metal salt derivative of the styrene derivative of Formula (I) is used as initiator for the copolymerization of i) one or more conjugated diene monomers and optionally ii) one or more vinyl aromatic monomers,
wherein the alkali metal is selected from lithium, sodium, and potassium.

10. A method for the preparation of a styrene derivative of Formula (I)

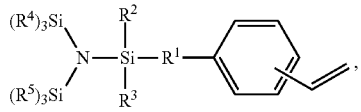
(I)

wherein $R^1$ is selected from the group consisting of:
a) a single bond;
b) —$(CH_2)_n$—, wherein n represents an integer from 1 to 12;
c) —$(CH_2CH_2Y)_n$—, wherein n represents an integer from 1 to 12, and Y can independently be oxygen or sulfur;
d) —$CH_2$—$(CH_2CH_2Y)_n$—$CH_2$—, wherein n represents an integer from 1 to 12, and Y can independently be oxygen or sulfur;
e) —$(CH_2CH_2NR)_n$—, wherein n represents an integer from 1 to 12, and R can independently represent an alkyl group containing from 1 to 10 carbon atoms, or an aryl or aralkyl group containing from 6 to 10 carbon atoms;
f) —$CH_2$—$(CH_2CH_2NR)_n$—$CH_2$—, wherein n represents an integer from 1 to 12, and R can independently represent an alkyl group containing from 1 to 10 carbon atoms, or an aryl or aralkyl group containing from 6 to 10 carbon atoms;
$R^2$, $R^3$ can be the same or different and represent an alkyl group containing from 1 to 10 carbon atoms, or an aryl or aralkyl group containing from 6 to 10 carbon atoms; and
$R^4$ and $R^5$ can be the same or different, and each $R^4$ and $R^5$ independently represents an alkyl group containing from 1 to 10 carbon atoms, or an aryl or aralkyl group containing from 6 to 10 carbon atoms;
wherein a halogenosilane of Formula (II)

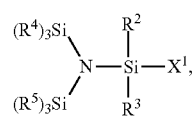
(II)

wherein $X^1$ is selected from chlorine, bromine, and iodine atoms, and $R^2$, $R^3$, $R^4$ and $R^5$ are as defined above,
is reacted with a magnesium compound of Formula (III),

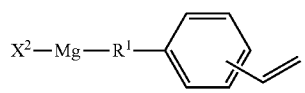
(III)

wherein $X^2$ is selected from chlorine, bromine, and iodine atoms, and $R^1$ is as defined above.

11. The method of claim 10, wherein the reaction is performed in an organic solvent in an inert gas atmosphere.

* * * * *